(12) United States Patent
Madden et al.

(10) Patent No.: US 7,408,558 B2
(45) Date of Patent: Aug. 5, 2008

(54) LASER-BASED DISPLAY HAVING EXPANDED IMAGE COLOR

(75) Inventors: Thomas E. Madden, Fairport, NY (US); Marek W. Kowarz, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 333 days.

(21) Appl. No.: 11/211,235

(22) Filed: Aug. 25, 2005

(65) Prior Publication Data

US 2007/0046690 A1 Mar. 1, 2007

(51) Int. Cl.
G09G 5/02 (2006.01)
G03F 3/08 (2006.01)
H04N 1/60 (2006.01)
G06K 9/00 (2006.01)
H04N 9/64 (2006.01)

(52) U.S. Cl. .................. 345/590; 345/589; 345/591; 345/204; 345/600; 348/645; 348/649; 348/839; 348/E9.026; 358/1.9; 358/518; 358/520; 382/162; 382/167

(58) Field of Classification Search ......... 345/589–591, 345/593, 597, 600–604, 618, 619, 635, 204–207, 345/690, 38–39, 83–84; 348/645, 649, 659–661, 348/652, 703, 712–713, 750–751, E9.026; 358/515–525, 1.9; 382/162–167

See application file for complete search history.

(56) References Cited

U.S. PATENT DOCUMENTS

| | | | |
|---|---|---|---|
| 5,440,352 A | 8/1995 | Deter et al. | |
| 5,786,823 A | 7/1998 | Madden et al. | |
| 6,025,885 A | 2/2000 | Deter | |
| 6,307,663 B1 | 10/2001 | Kowarz | |
| 6,736,514 B2 | 5/2004 | Horvath et al. | |
| 6,774,953 B2 | 8/2004 | Champion et al. | |
| 6,802,613 B2 | 10/2004 | Agostinelli et al. | |
| 2003/0122505 A1* | 7/2003 | Huber et al. | 315/291 |
| 2005/0138160 A1* | 6/2005 | Klein et al. | 709/223 |
| 2005/0280851 A1* | 12/2005 | Kim et al. | 358/1.9 |
| 2006/0026224 A1* | 2/2006 | Merkli | 708/800 |
| 2006/0120598 A1* | 6/2006 | Takahashi et al. | 382/167 |
| 2006/0209325 A1* | 9/2006 | Nishikuni | 358/1.9 |

OTHER PUBLICATIONS

Textbook: R.W.G. Hunt, "Measuring Colour," Ellis Horwood Limited, 1987, Chapter 3, pp. 63-69.
Textbook: R.W.G. Hunt, "The Reproduction of Colour," 6th Edition, John Wiley & Sons Ltd., 2004, Chapter 8, pp. 109-115.
Textbook: Charles A. Poynton, "A Technical Introduction to Digital Video," Wiley, 1996.
M. H. Brill, "Colors and Display Measurements," SID Mid-Atlantic Chapter Lecture, Oct. 13, 1999.

* cited by examiner

Primary Examiner—Wesner Sajous
(74) Attorney, Agent, or Firm—Stephen H. Shaw

(57) ABSTRACT

A method for displaying a color image by providing a color image display apparatus having at least three narrow-band emissive light sources that define a display color gamut. Image data values are accepted that are defined within an original color gamut that is smaller in area than the display color gamut. The input image data values are transformed into display color gamut data values having an expanded image chromaticity range. At least a portion of the expanded chromaticity range lies outside the original color gamut. At least a portion of the display color gamut lies outside the expanded image chromaticity range. The display color gamut data values are provided to the color image display apparatus to form an image.

23 Claims, 14 Drawing Sheets

Table 2

| Points | Broadcast RGB Value | Intermediate RGB Value |
|---|---|---|
| 102r | (100, 0, 0) | (73.7, 2.3, 0.1) |
| 102g | (0, 100, 0) | (28.8, 98.9, 2.6) |
| 102b | (0, 0, 100) | (-0.6, -1.3, 97.3) |
| 104 | (10, 100, 50) | (33.9, 98.6, 51.3) |

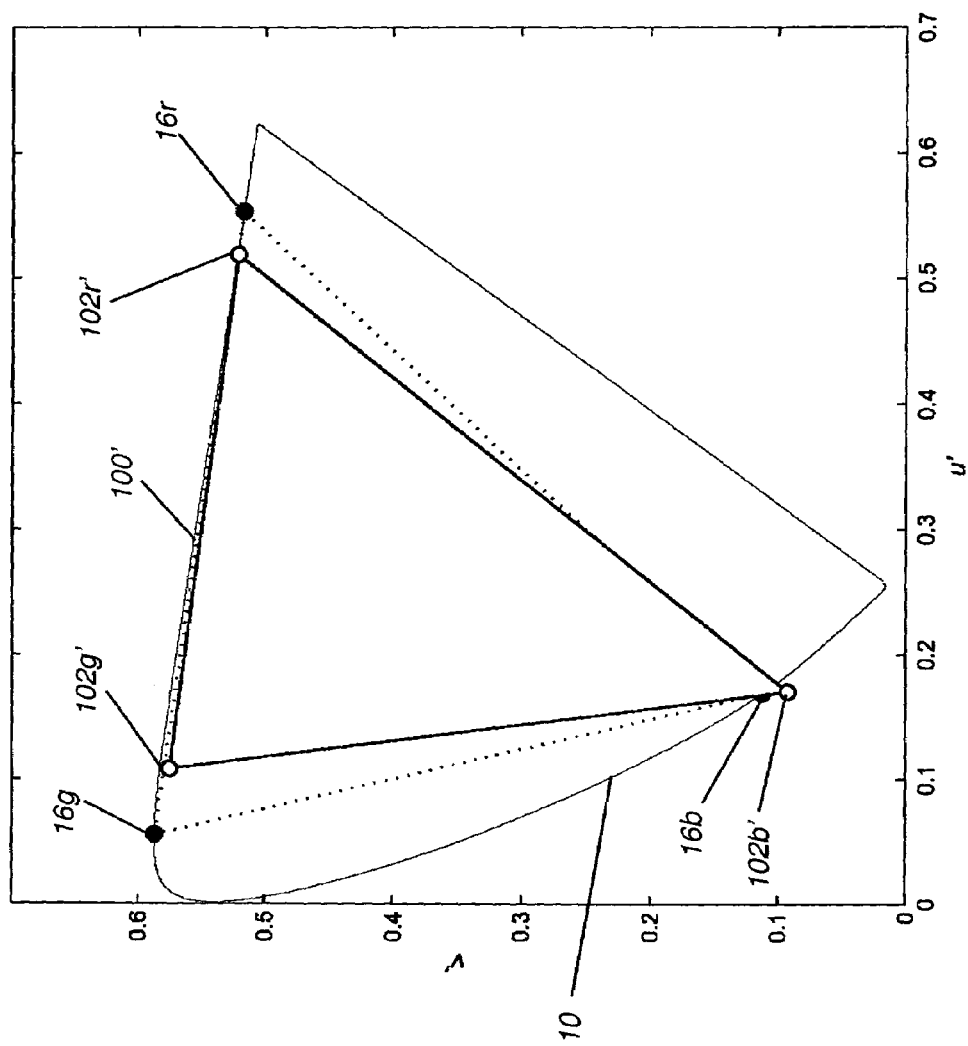

LASER-BASED DISPLAY HAVING EXPANDED IMAGE COLOR

FIELD OF THE INVENTION

The invention relates generally to color display and more particularly relates to a method and apparatus for a color display using narrow-band emissive light sources to provide an expanded color gamut.

BACKGROUND OF THE INVENTION

The conventional tristimulus color gamut devised for color television broadcasting and adapted for conventional CRT displays used in computer monitors and related types of displays is based on the red, green, and blue light emitted from CRT phosphors. The CIE (Commission Internationale de l'Eclairage or "International Commission on Illumination") Standard Colorimetric Observer, first drafted in 1931 and revised in years following, defines a color space in which the color gamut for a phosphor-based CRT display device can be represented. Any such color gamut within this color space is defined by the three primary colors that are emitted by a standard set of CRT phosphors. FIG. 1A shows a chromaticity diagram with a two-dimensional projection of the conventional broadcast television color gamut based on the CIE 1976 u', v' Metric Chromaticity Coordinates representation that is familiar to those skilled in the color display arts and is in conformance with International Telecommunications Union (ITU) specification ITU Rec. 709.

In this chromaticity representation, an outer curve, or spectrum locus 10 represents the range of pure colors, that is, colors of a single wavelength. The ends of the spectrum locus are connected by the line known as a purple boundary 11. The area bounded by spectrum locus 10 and purple boundary 11 contains the colors that can be perceived by the human visual system. An inner triangle 12 represents the conventional ITU Rec. 709 color gamut. Vertices 14r, 14g, 14b of triangle 12 are defined by the three primary CRT phosphor emission colors, red, green, and blue, respectively.

Referring to FIG. 1B, various regions and characteristics of the ITU Rec. 709 color gamut representation are indicated for reference. Neutral colors are approximately centered about a white point 20 within triangle 12. Constant hue lines 22 radiate outwards from white point 20. Colors on the same constant hue line 22 have the same hue, varying by saturation, which is proportional to the distance of the color coordinates from white point 20. For example, colors at coordinates 24 and 26 in FIG. 1B have the same hue; color 26 has increased saturation over color 24. Constant hue lines 22 are represented using dashed lines in FIG. 1B, which are substantially straight, exhibiting slight curvature when using this chromaticity representation.

As is readily apparent from FIGS. 1A and 1B and well known to those skilled in color reproduction, the ITU Rec. 709 color gamut represented by the area of triangle 12 is limited with respect to the range of color that could be represented by a display in the ideal case, represented by the full gamut of physically realizable colors contained within the region defined by the spectrum locus 10 and purple boundary 11. This is because CRT display phosphors, upon which the ITU Rec. 709 color gamut has been based, do not emit pure colors, that is, they do not emit light having a single wavelength. In terms of the graph of FIG. 1A, the limited gamut is represented by vertices 14r, 14g, 14b of triangle 12 lying well within the region bounded by spectrum locus 10 and purple boundary 11. Because of the relatively limited color gamut available using the ITU Rec. 709 encoding, many colors cannot be adequately represented and must therefore be approximated. This is particularly true for colors that are highly saturated.

The development of low-cost lasers at visible wavelengths now offers the promise of significantly increased color gamut in color display applications. This is because, unlike the CRT phosphors upon which the ITU Rec. 709 encoding is based, the laser emits light of nearly a single wavelength. Thus, in terms of the gamut representation in the chromaticity diagrams of FIGS. 1A and 1B, primary colors from laser sources lie on the periphery of spectrum locus 10, rather than well inside this curve, as is true for the CRT phosphor primaries of the ITU Rec. 709 gamut. In FIG. 1A, points 16r, 16g, and 16b represent the positions of laser color primaries within this spectrum locus, for one specific set of laser primaries. These and other such color vertices lying directly on spectrum locus 10 can provide a substantially greater possible color gamut obtainable by a display.

There has been some effort expended to take advantage of laser capabilities for color display. Methods and apparatus for adapting the color gamut capabilities of display systems that use laser primaries are described, for example, in the following:

Commonly assigned U.S. Pat. No. 6,802,613 entitled "Broad Gamut Color Display Apparatus Using an Electromechanical Grating Device" to Agostinelli et al., and No. 6,736,514 entitled "Imaging Apparatus for Increased Color Gamut Using Dual Spatial Light Modulators" to Horvath et al., disclose display apparatus using more than three lasers to expand the color gamut;

U.S. Pat. No. 6,774,953 entitled "Method and Apparatus for Color Warping" to Champion et al., discloses a method for using Look-Up Tables (LUTs) to adapt gamma-corrected R'G'B' color data encoded for CRT display to an expanded color space afforded by a laser display. The Champion et al. '953 disclosure does not, however, describe how LUT values are derived.

While these and other patents describe how an expanded color gamut can be obtained and describe techniques for quick computation of transformed color data values suited to an alternate color gamut, however, the problems of accurate hue reproduction and preservation of near neutral colors have not been addressed. In terms of the graph of FIG. 1B, near-neutral colors are those within a relatively short distance from white point 20. Near-neutral colors include pastels and other low-saturation colors.

With the corresponding development of spatial light modulators that are ideally suited to handle laser illumination, such as the electromechanical conformal grating device disclosed in U.S. Pat. No. 6,307,663, entitled "Spatial Light Modulator with Conformal Grating Device" to Kowarz, for example, there is heightened interest in the possibility of expanding the relatively constrained ITU Rec. 709 color gamut and displaying colors that are more visually pleasing.

Two basic approaches have been followed for transforming the color gamut of the ITU Rec. 709 standard to that afforded by lasers. The first approach, as proposed in U.S. Pat. No. 5,440,352 entitled "Laser-Driven Television Projection System with Attendant Color Correction" to Deter et al., discloses a mapping of color data that simply adapts the gamut of a laser display to the conventional ITU Rec. 709 gamut, so that lasers simply replace the CRT phosphors. While this approach allows the use of laser illumination as a substitute for CRT display, however, it fails to take advantage of the broader color gamut afforded by lasers. In effect, the method proposed in the Deter et al. '352 disclosure simply performs a re-mapping of colors from the ITU Rec. 709 gamut, while also compensating for certain areas of the color gamut that may not be easily reached using lasers, but without an attempt to take advantage of the potentially broader color gamut afforded by a set of visible light lasers. While this approach allows the implementation of lasers for color display, color gamut expansion is not a goal of the Deter et al. '352 disclosure. Typically, a Look-Up Table (LUT) or 3×3 matrix is used to provide color transformation, mapping input ITU Rec. 709 values in one color gamut to the expanded output color gamut.

A second approach follows the solution of simply remapping a smaller color gamut to a larger one. In its most basic form, this approach simply applies the ITU Rec. 709 encoded data values directly to the broad gamut of the laser display, without applying any type of transformation to the data values. Unlike the re-mapping of the Deter et al. '352 disclosure, this second approach proposes expansion of the color gamut to take advantage of the pure wavelengths of laser emission. In conventional use, this basic approach has been found appropriate, for example, where one set of CRT phosphors provides an incremental increase in gamut over another set of CRT phosphors; this would correspond to slightly expanding the area of triangle 12 in FIG. 1A. For such a case, the increased saturation could provide a more appealing display of color and any subtle hue changes that might result may be imperceptible.

While this second approach would be suitable in moving from one phosphor set to an improved phosphor set, where there is incremental expansion of color gamut, this approach is not ideal for transformations between the ITU Rec. 709 phosphor primaries and laser primaries, where a substantial color gamut transformation is possible. Where larger chromatic increments are involved, color re-mapping or transformation from one color gamut to another is complicated by perceptual and psychophysical factors. Thus, experimentation has shown that a more pleasing or realistic color display of ITU Rec. 709 encoded color data is not necessarily achieved by simply expanding the color gamut, so that, for example, points 16r, 16g, and 16b on curve 10 now serve as the new primary colors, providing vertices for a broadened color gamut. Even though a significantly broader range of colors can now be displayed, simply remapping colors to a broadened color gamut does not necessarily provide a satisfactory result.

In transforming colors represented in a restricted-gamut encoding, such as ITU Rec. 709, to a gamut using laser primaries, the conventional techniques that worked well enough when handling subtle changes between different CRT phosphor sets have been shown to be less than satisfactory. With respect to FIG. 1B, near-neutral colors and flesh tones, for example, may no longer appear realistic when using conventional re-mapping techniques. Other undesirable hue changes are noticeable, particularly since laser display primary colors typically differ in hue from phosphor primary colors.

Thus, in spite of the promise of considerably improved color representation with lasers, the results obtained when applying conventional gamut expansion techniques have been surprisingly disappointing. Therefore, while it seems that an expanded color gamut should yield significant improvements in the appearance of a color display, true improvements have proven to be somewhat more elusive.

There is, then, a need for display apparatus and methods that take advantage of the broadened color gamut afforded by laser illumination, to provide a display that is more visually pleasing and is well-suited to the color perception of the viewer when used in conjunction with standard broadcast-encoded color-image data.

SUMMARY OF THE INVENTION

The present invention is directed to overcoming one or more of the problems set forth above. Briefly summarized, the present invention provides a method for displaying a color image by providing a color image display apparatus that has at least three narrow-band emissive light sources that define a display color gamut. Subsequently, input color image data values are accepted that are defined within an original color gamut that is smaller in area than the display color gamut. The input color image data values are transformed into display color gamut data values having an expanded chromaticity range, wherein at least a portion of the expanded chromaticity range lies outside the original color gamut, and wherein at least a portion of the display color gamut lies outside the expanded chromaticity range. The display color gamut data values are provided to the color image display apparatus for forming the color image.

It is a feature of the method of the present invention that it requires only one straightforward transformation computation applied to input image data in order to adapt broadcast-encoded color image data to an enlarged color display gamut.

It is an advantage of the present invention that it provides a display apparatus capable of providing pleasing images having a larger color gamut than is available with conventional display devices.

It is a further advantage of the present invention that it does not require large amounts of storage such as can be required of conventional color transformation techniques using LUTs.

These and other features and advantages of the present invention will become apparent to those skilled in the art upon reading the following detailed description when taken in conjunction with the drawings, wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 4A through 4F are diagrams that show various steps executed in image-data processing according to the present invention;

DETAILED DESCRIPTION OF THE INVENTION

The present description is directed in particular to elements forming part of, or cooperating more directly with, apparatus in accordance with the invention. In the following description, it is to be understood that the term "color gamut" is used to describe what can be more broadly termed a "chromaticity range" and is used with reference to conventional two-dimensional chromaticity gamuts depicted using CIE chromaticity coordinate systems. It also is to be understood that elements not specifically shown or described may take various forms well known to those skilled in the art.

As noted in the background section given above, conventional methods for gamut expansion using laser sources have yielded surprisingly disappointing results thus far due to inordinate amounts of hue shift, loss of realistic near-neutral and flesh tones, and an overall unrealistic image appearance. The method and apparatus of the present invention address the problem of color gamut expansion in a novel manner, using an intermediate color space to perform, with a single transformation, a simple re-mapping of image data, providing a display that exhibits hue characteristics faithful to those of the original encoded data but having increased color saturation without overemphasizing the saturation of near-neutrals and flesh tones.

Saturation is a measure of color intensity, richness, or purity, closely related to the attributes of chroma or colorfulness. For a color of a given hue, its CIE 1976 u, v saturation, $s_{uv}$, is proportional to Euclidean distance in the CIE u', v' chromaticity diagram between the color's chromaticity coordinates and those of a suitably chosen reference white. Relative to white point 20 in FIG. 1B, for example, colors of high saturation are those furthest from white point 20, near the periphery of the color gamut of triangle 12. Saturation, in this chromaticity diagram, increases monotonically with increased distance from white point 20. At maximum saturation, a color appears pure and intense, particularly where lasers are used as color primaries.

Figure 1A:
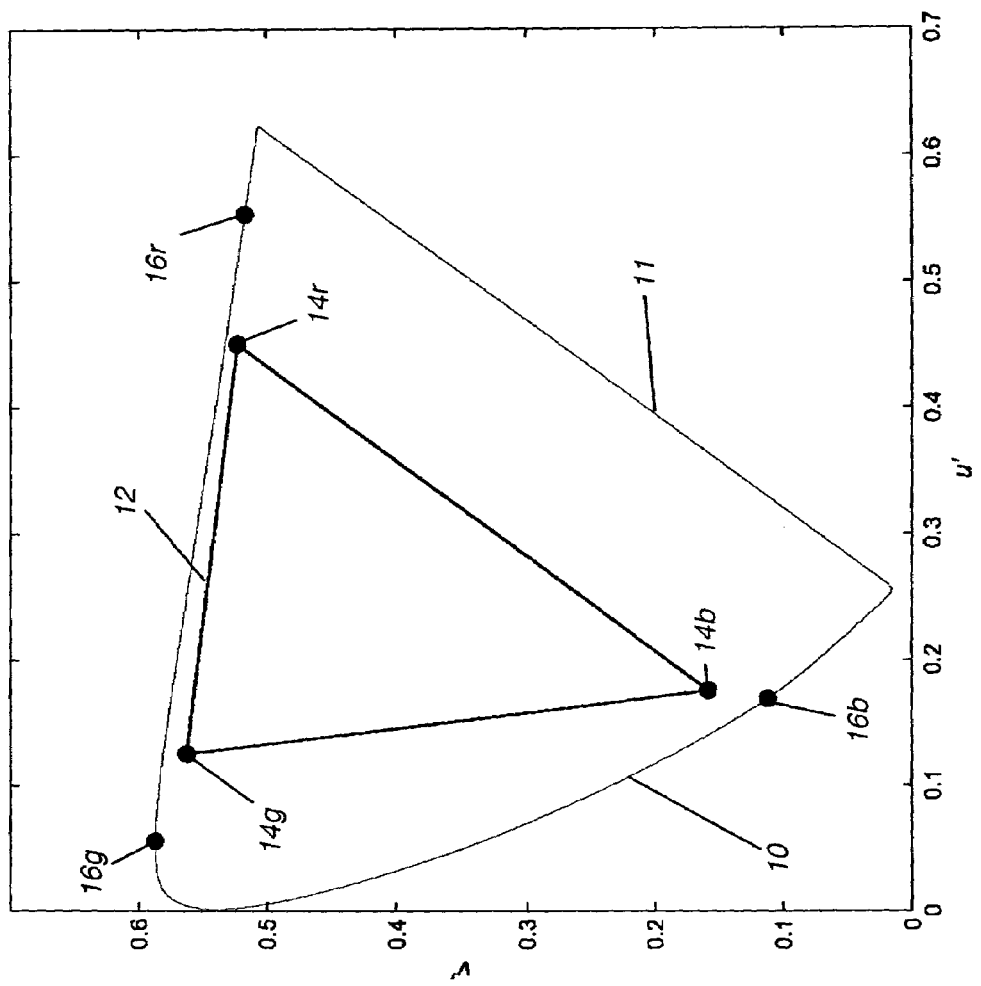
FIG. 1A is a CIE u', v' chromaticity diagram showing a conventional broadcast color gamut.
Figure 1B:
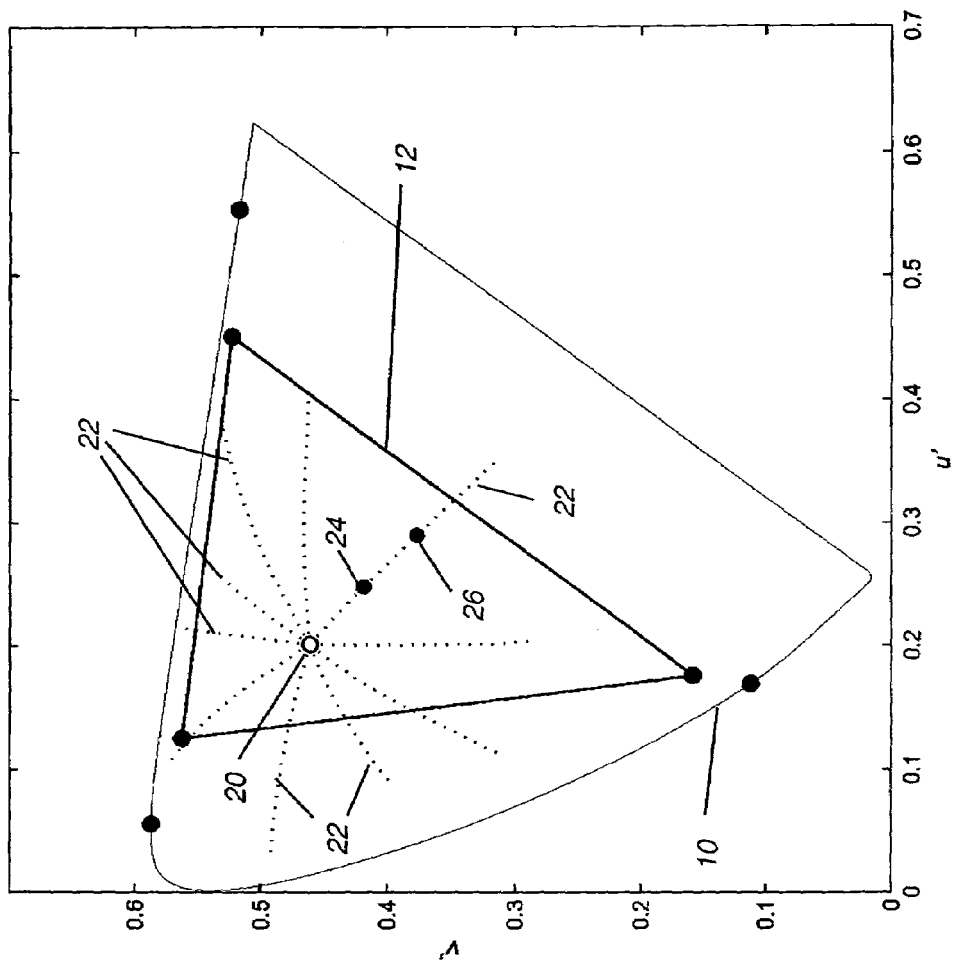
FIG. 1B is a CIE u', v' chromaticity diagram highlighting various characteristics of color gamut representation significant for the present invention.

In broad terms, with reference to FIG. 1B, near-neutral colors are those with coordinates in the region nearby white point 20. For the description of the present invention that follows, near-neutral colors are best defined using the conventional Munsell® color notation, well known to those skilled in the color imaging arts. The range of near-neutral colors is spanned by a range of color samples from the *Munsell® Book of Color Nearly Neutrals Collection*, available from GretagMacbeth AG. With reference to this standard, near-neutral colors correspond to color samples having Munsell-assigned values between 6/and 9/and Munsell chroma levels less than or equal to /4.

One goal of the present invention is to have little perceptible effect on the reproduced saturation of such near-neutral colors. As colors outside of this near-neutral region grow continually more saturated with increased distance from white point 20, the present invention provides an increasingly more pronounced change in reproduced saturation. For highly saturated colors in the original broadcast-encoded image data, a correspondingly high increase in reproduced saturation is provided. Overall, a monotonically increasing relationship is provided for increasing saturation values. That is, for an increasing set of saturation values for any range of colors in the original broadcast encoded data, the newly derived set of saturation values obtained using the method of the present invention is monotonically increasing.

At the same time, for all colors, even as saturation values are increased the present invention maintains hue fidelity. That is, with reference to FIG. 1B, each color transformation of the present invention maintains the color substantially along its original hue line 22, so that the hue value for any color does not change by an objectionable amount.

Using standard color imaging definitions found, for example, in chapter 3 of "Measuring Colour" by R. W. G. Hunt, 1987, Ellis Horwood Limited, or chapter 8 of "The Reproduction of Colour," 6$^{th}$ edition, also by R. W. G. Hunt, 2004, John Wiley & Sons Ltd., two colors having substantially the same hue have a minimal calculated CIE Psychometric Hue difference, $\Delta H^*$. For example, an original color has a given CIE psychometric hue (H*), CIE metric chroma (C*), and CIE metric lightness (L*). In general, a measure of perceptible difference is given in terms of $\Delta E^*$ wherein:

$$\Delta E^* = \sqrt{((\Delta H^*)^2 + (\Delta L^*)^2 + (\Delta C^*)^2)}$$

Using this conventional calculation method, psychometric hue (H*), metric chroma (C*), and metric lightness (L*) are equally weighted. A standard observer viewing paired samples under controlled viewing conditions can just detect a difference in which $\Delta E^*$ is above 1.0. A somewhat less rigorous value is generally acceptable. For most images, particularly those having a substantial amount of image content of various colors, a practical threshold value for a just-noticeable difference $\Delta E^*$ would be about 2 or 3.

For example, in the case where metric lightness L* and psychometric hue H* are held constant, both metric lightness difference $\Delta L^*$ and psychometric hue difference $\Delta H^*$ are zero. Thus, in such a case, the modified color would be solely attributable to the change in CIE metric chroma $\Delta C^*$, which can be considered a measure of chromatic distance. When considering hue perceptibility, a $\Delta H^*$ of 1.0 or greater would be perceptible. Therefore, maintaining a substantially constant hue value for a color pixel means keeping this $\Delta H^*$ value at less than about 3.0 for most colors.

Figure 2A:
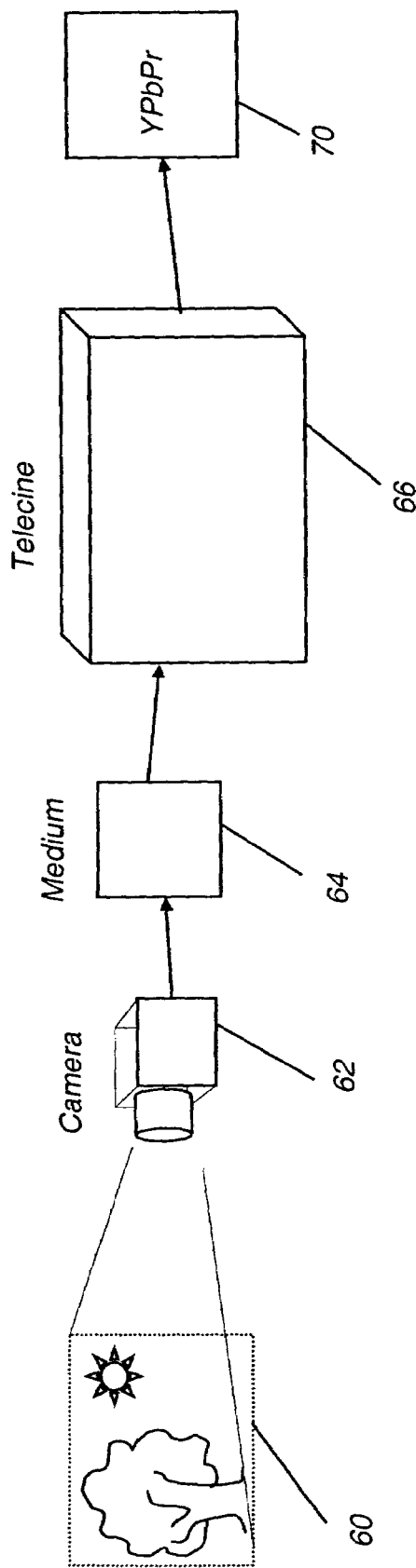
FIG. 2A is a block diagram showing the conventional processing sequence for color image data for broadcast.

In order to best understand the present invention and the definitions used herein, it is instructive to briefly review how image data is encoded for broadcast. Referring to FIG. 2A, there is shown an overall processing sequence used for forming broadcast-encoded image data. Broadcast-encoded data includes data encoded in terms of ITU Rec. 709 and related formats used for television, and also including HDTV, for example. Broadcast formats include conventional formats referred to as NTSC (National Television System Committee) or PAL (Phase Alternate Lines) format, for example. Broadcast formats also include digital formats such as defined in ITU-R BT.601.

In FIG. 2A, a scene 60 is captured by a camera 62 that stores the image of scene 60 on a medium 64, typically motion picture film or other storage medium 64. A telecine apparatus 66 then scans medium 64 and performs processing to provide broadcast-encoded data 70, conventionally in YPbPr format. This data, having suitable gamma characteristics to compensate for typical nonlinear CRT response, can then be broadcast for standard CRT-based television display. As is well known in the art, the conversion from film medium 64 by telecine apparatus 66 results in some loss of gamut and overall dynamic range relative to the film medium.

Figure 2B:
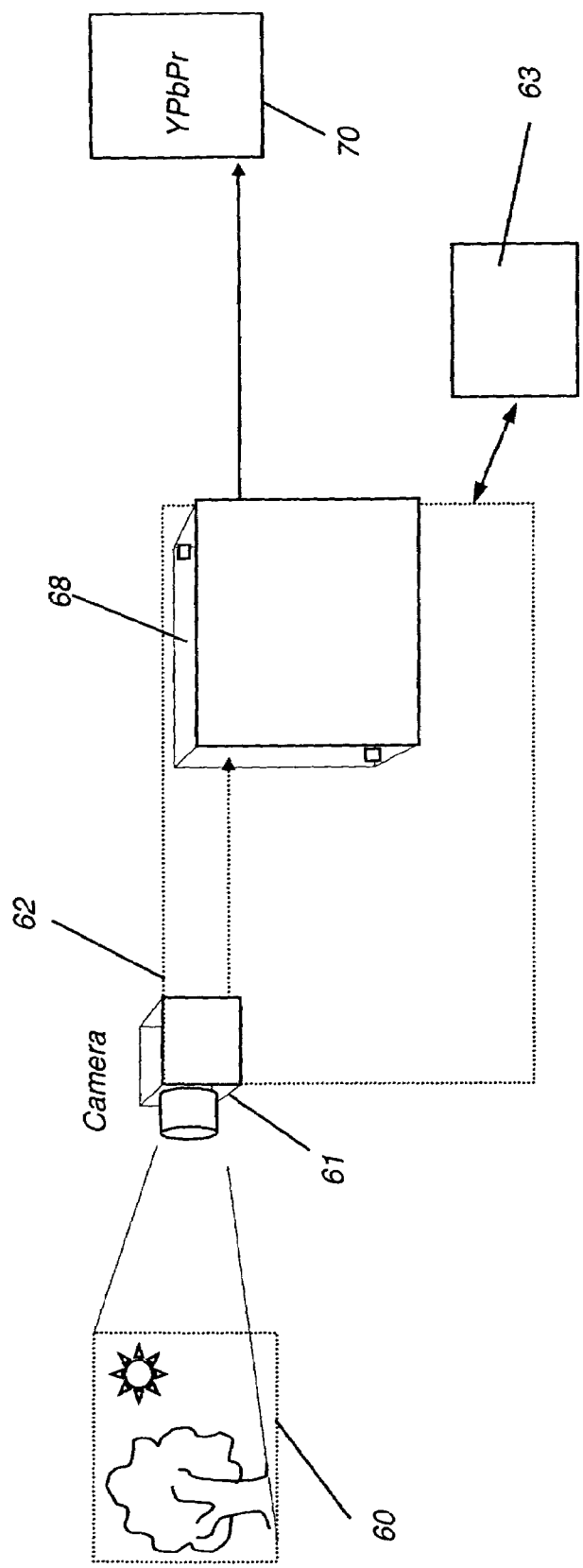
FIG. 2B is a block diagram showing an alternate processing sequence for color image data for broadcast.

FIG. 2B shows an alternate arrangement in which scene content is captured and processed within camera 62. In this arrangement, camera 62 has an image capture section 61 and a processing section 68 that provides broadcast-encoded data 70 in YPbPr or other suitable format. This allows broadcast-format image-bearing signals to be further processed by video encoders. A data storage device 63, such as a hard drive, an optical drive or a flash drive, can store the scene data for later use. The data storage device 63 may be internal or external to camera 62.

Figure 3:
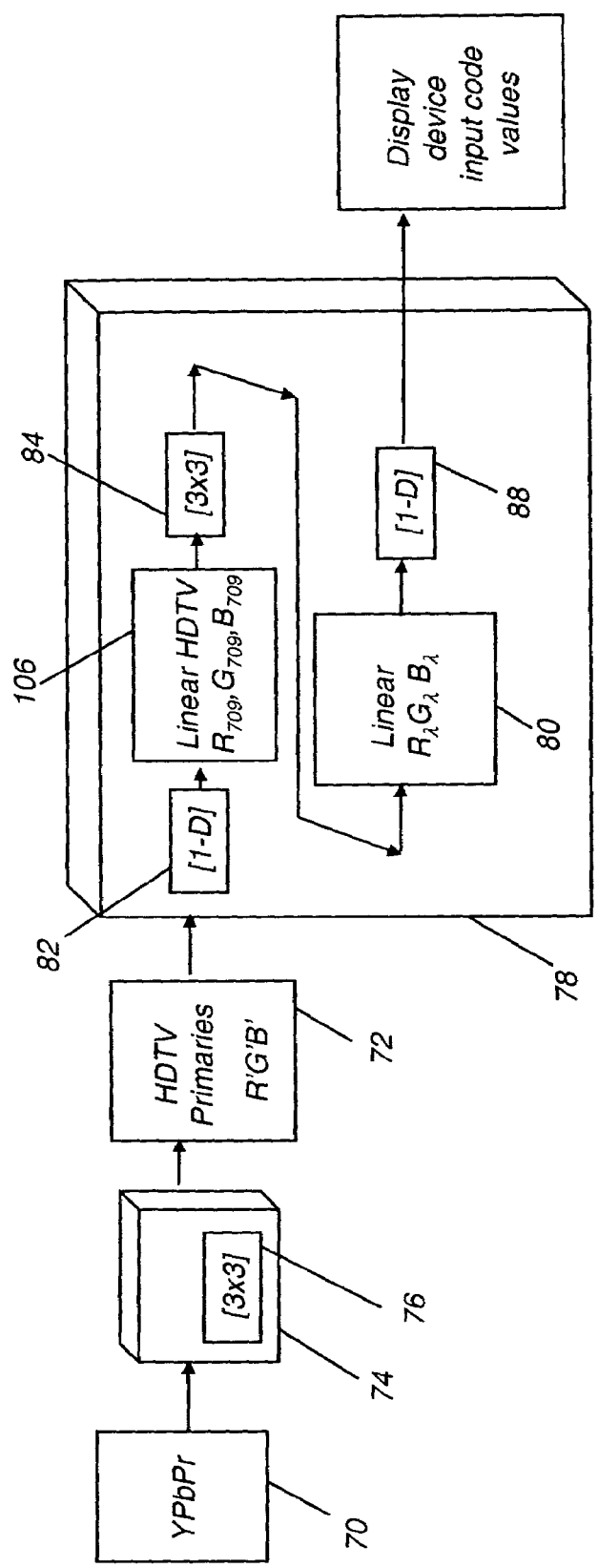
FIG. 3 is a block diagram showing processing steps for a laser-based display apparatus.

FIG. 3 shows the additional output signal processing of broadcast encoded data 70 that is conventionally performed for HDTV (High Definition TV) television display. Broadcast encoded data 70 is transformed by a processor 74, typically using a standard 3×3 matrix transform 76, to provide, in terms of HDTV primaries 72, gamma-corrected R'G'B' data, which are suitable for controlling the light-emitting elements of a display device whose RGB color primaries and gamma characteristic are substantially similar to that anticipated by the broadcast encoding standard. When the display device gamma or color primaries differ considerably from the standard, additional output signal processing is used to make appropriate compensation. In this case, a processor 78 then performs a 1-dimensional transform 82 on each primary color signal to compensate for the gamma correction applied by the encoding process, providing linear HDTV data 106, with values $R_{709}$, $G_{709}$, and $B_{709}$. Processor 78 then performs a transformation using a transform 84, typically in the form of a 3×3 matrix, to convert linear HDTV data 106 that is encoded in terms of broadcast specification color primaries to the alternate RGB primaries corresponding to the selected display device as linear RGB data 80, and represented as $R_\lambda G_\lambda B_\lambda$ data.

In one embodiment, for example, transform 76 for conversion from YPbPr to RGB encoding employs a 3×3 matrix with the following values:

$$\begin{bmatrix} R \\ G \\ B \end{bmatrix} = \begin{bmatrix} 1.0 & 0.0 & 1.575 \\ 1.0 & -0.187 & -0.468 \\ 1.0 & 1.856 & 0.0 \end{bmatrix} * \begin{bmatrix} Y \\ Pb \\ Pr \end{bmatrix}$$

This standard decoding matrix is based on the Rec. 709 luma coefficients and can be derived using methods known to those in the art and documented, for example, in *A Technical Introduction to Digital Video* by Charles A. Poynton, Wiley, 1996. Other decoding matrices based on other standard video luma coefficients and color-difference components also can be used as appropriate to the particular system considered.

In one embodiment, the 3×3 matrix transform 84 is replaced with a novel 3×3 matrix in order to transform the image data suitably for a display apparatus that employs laser light to provide its primary colors and to provide a reproduced image whose color gamut is substantially increased without having the perceptual deficiencies of the prior art cited. An additional device-specific transform 88 may also be executed by processor 78 for gamma adjustment, tone reproduction, and calibration. Example 3×3 matrices and 1-D transformation matrices are described subsequently. It must be observed that FIG. 3 is a logic diagram showing a functional sequence; alternative sequences could also be used for transforming broadcast-encoded data according to the present invention and for providing display device input code values to the display apparatus. For example, multiple transforms could be incorporated into one or more composite transforms for more efficient processing, as described, for example, in commonly assigned U.S. Pat. No. 5,786,823 entitled "Method and apparatus employing composite transforms of intermediary image data metrics for achieving imaging device/media compatibility and color appearance matching" to Madden et al.

Figure 4A:
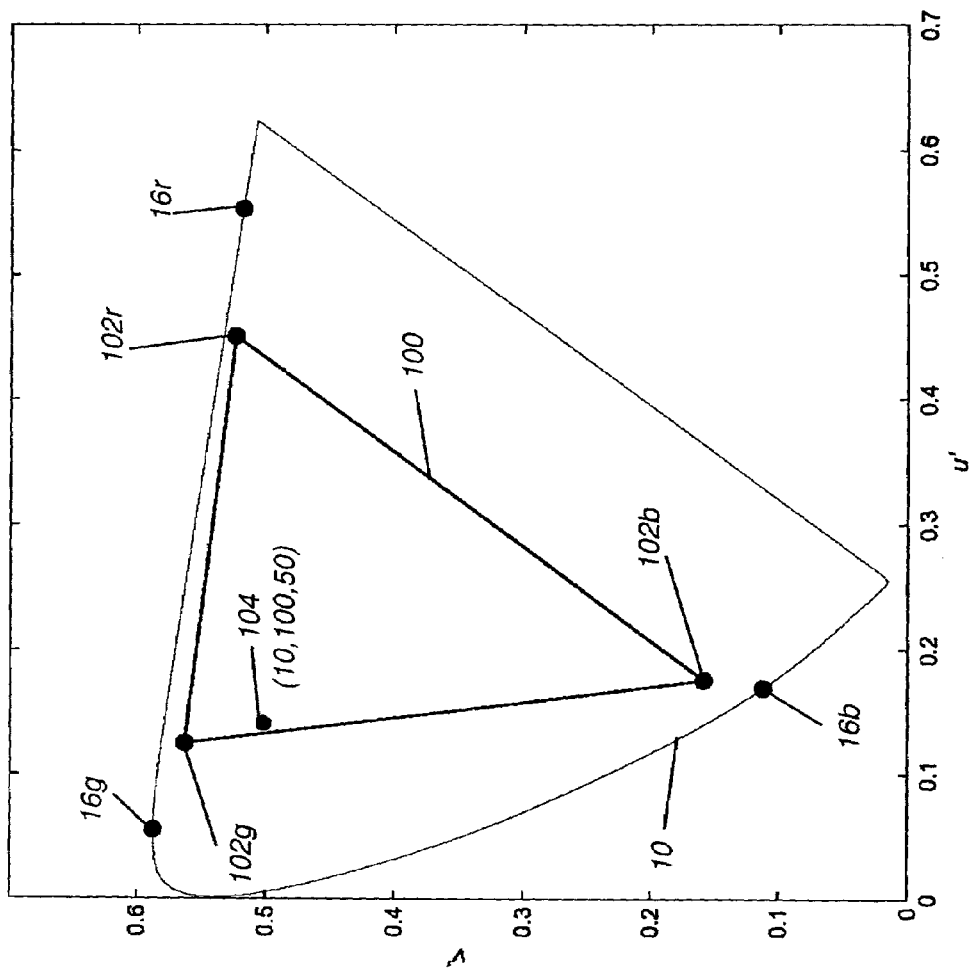
Figure 4B:
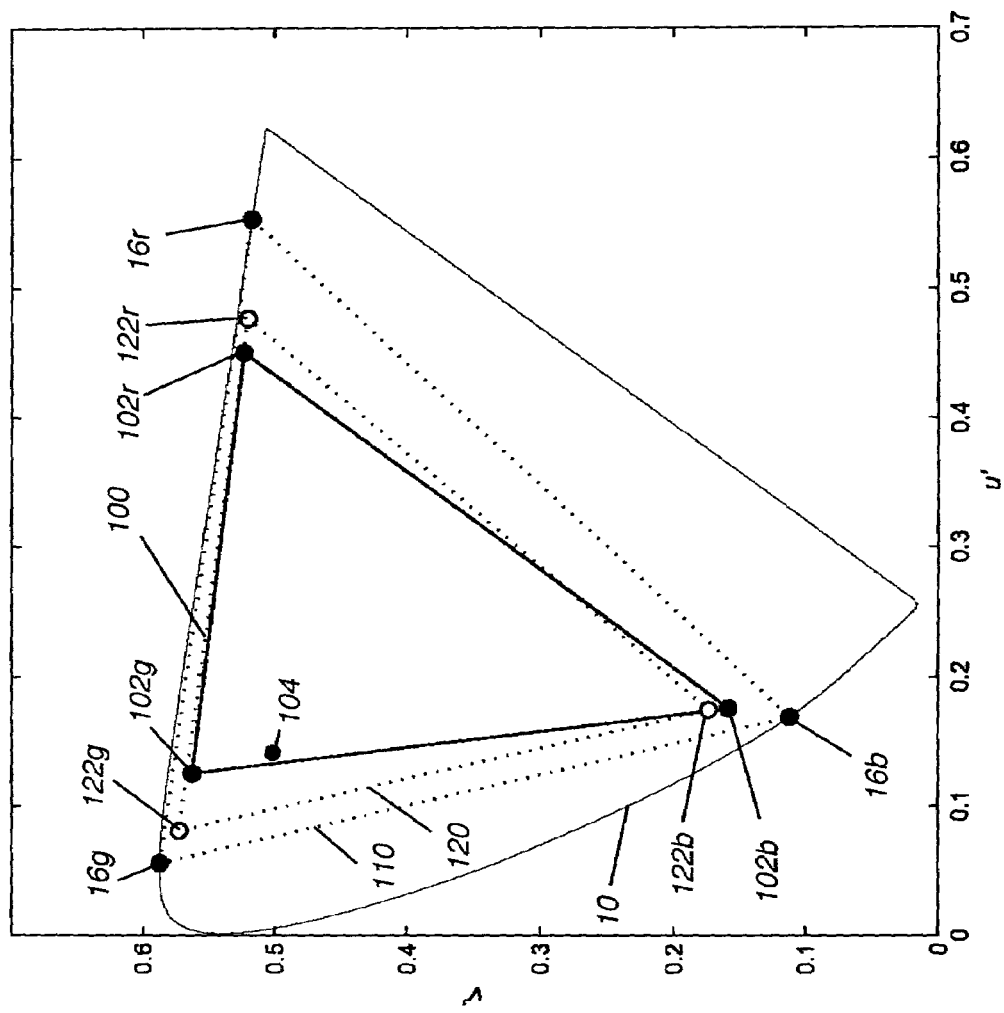
Figure 4C:
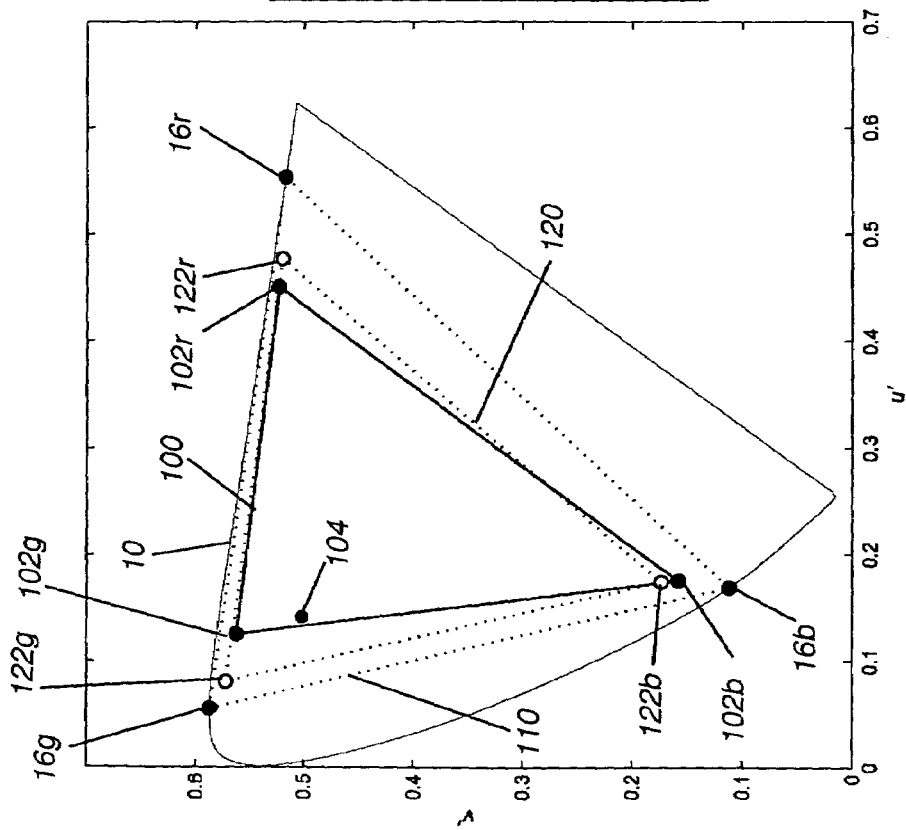
Figure 4D:
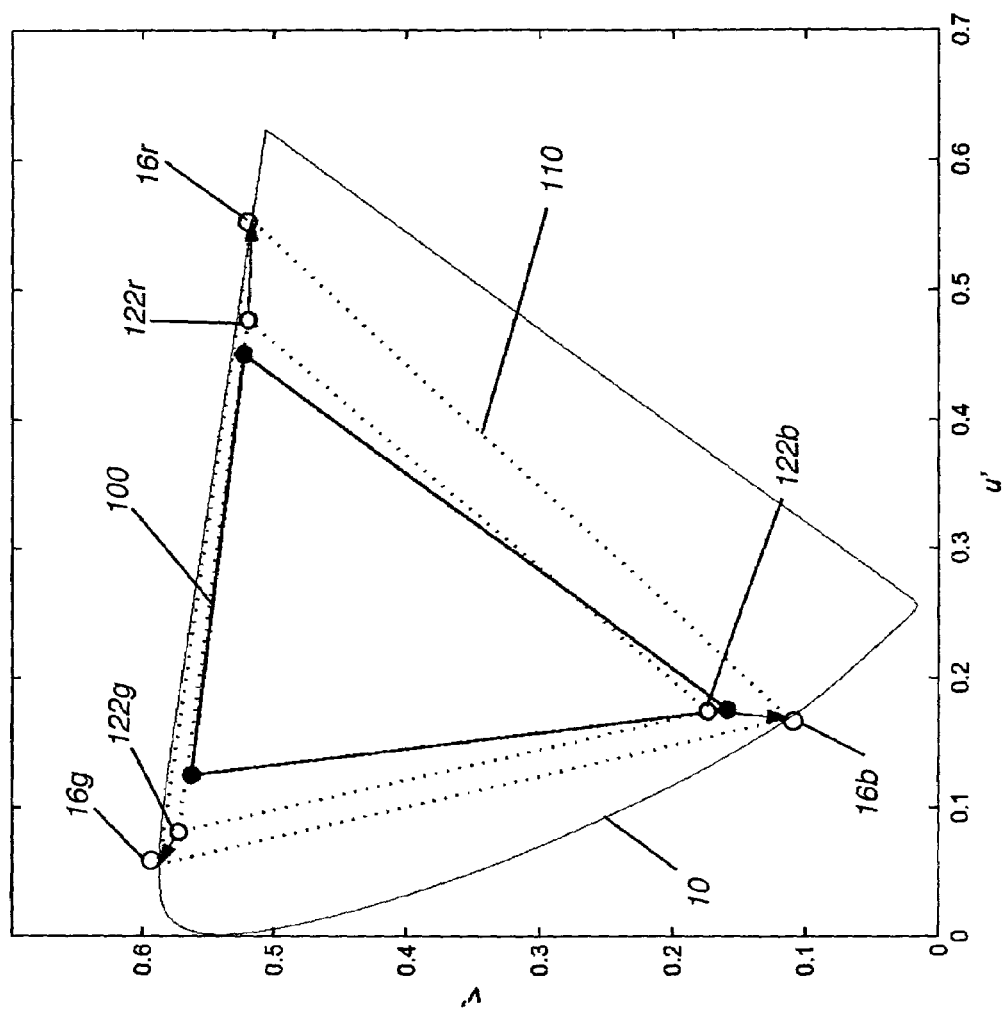
Figure 4F:
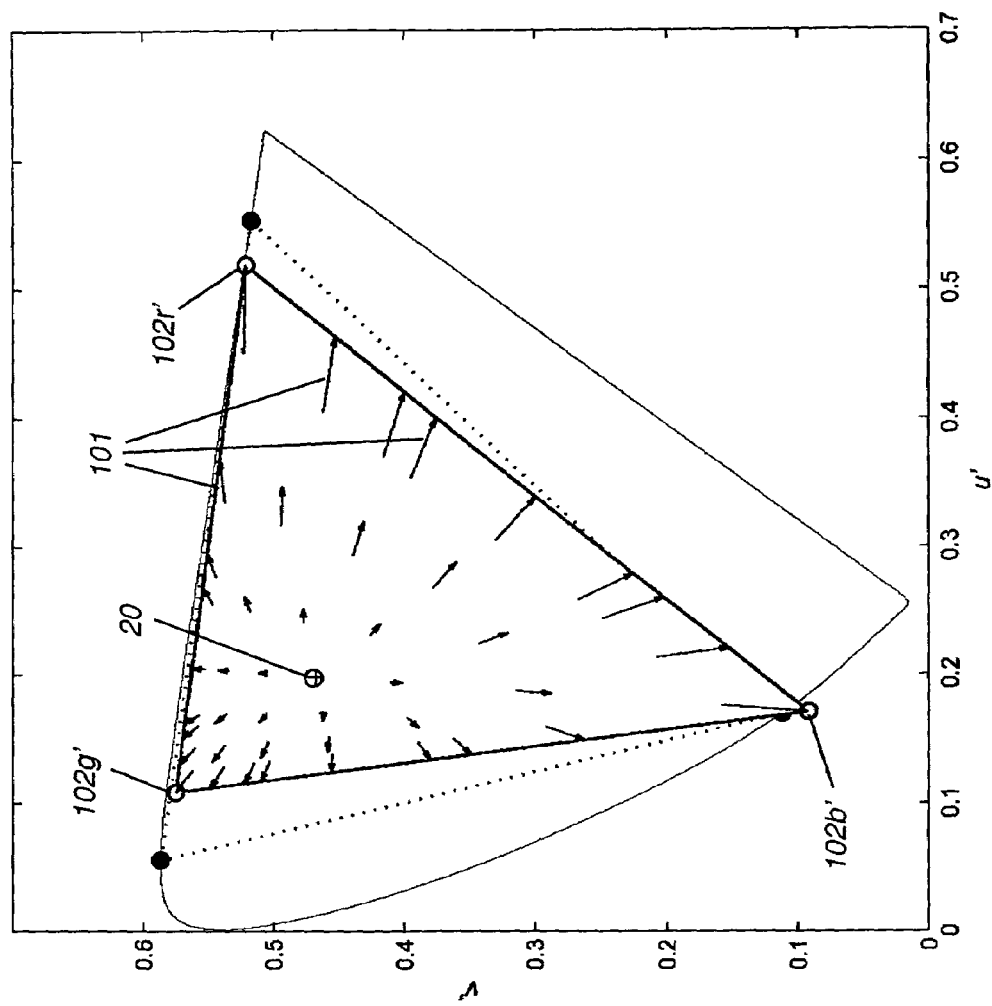
Figure 5:
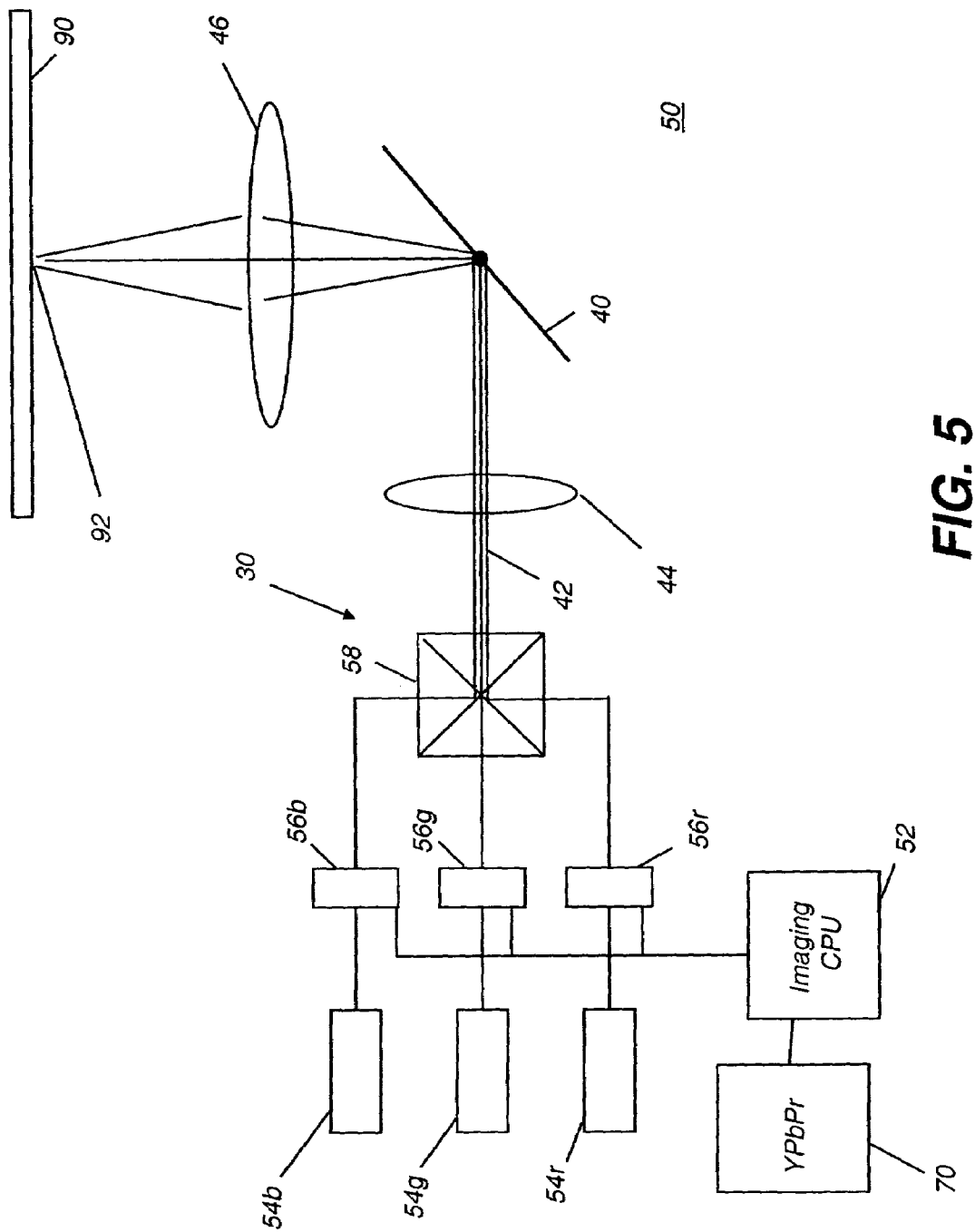
FIG. 5 is a schematic diagram showing basic components of a display apparatus according to one embodiment; and, FIGS. 6A and 6B are diagrams that show color image data processing for an embodiment using an alternate set of primary wavelengths.

Referring to FIG. 5, there are shown, in schematic form, basic components of a display apparatus 50 according to an exemplary embodiment of the present invention. Broadcast encoded image data 70 is input to an imaging control logic processor 52 that performs the processing described with respect to FIG. 3 and also performs the additional processing for each image pixel described subsequently with reference to the sequence of FIGS. 4A through 4F. Lasers 54r, 54g, and 54b provide the primary colors that are used to form a color image. During display operation the laser is generally not turned off, but is rather kept in one of two states: either below a dark threshold output value or energized to provide light.

For simplicity of discussion, the conventional RGB color processing model is employed, with laser 54r providing visible light at a red wavelength (nominally 620-650 nm), laser 54g providing visible light at a green wavelength (nominally 520-540 nm), and laser 54b providing visible light at a blue wavelength (nominally 430-470 nm). In practice, additional lasers could be provided, as disclosed in the Agostinelli et al. '613 patent cited above. Alternatively, a different set of primary colors could be used.

The laser light is directed to spatial light modulators 56r, 56g, and 56b, following the RGB paradigm described above. A variety of different types of spatial light modulators could be used, such as the electromechanical conformal grating device or conformal GEMS device, with GEMS standing for Grating ElectroMechanical System, as disclosed in the Kowarz et al. '663 patent cited above.

Color-combining optics 30 then combine the colors onto a single optical path. Color combining optics 30 may include, for example, an X-cube 58 as shown in FIG. 5, or may use some other conventional technique and components for directing modulated light, as is well known in the electronic color imaging arts. The composite color signal 42 is then directed through one or more lenses 44 to a scanner 40 (typically needed with the GEMS device and with various other types of light modulators) and to a projection lens 46 for directing the composite color signal to a display surface 90.

The arrangement of components in display apparatus 50 shown in FIG. 5 is exemplary and is not intended to be limiting. It can be appreciated by those skilled in the electronic color imaging arts that any number of similar embodiments could be used to provide color pixels 92 on display surface 90, wherein each color pixel 92 is formed as a composite of primary colors provided by lasers 54r, 54g, and 54b. For example, a laser display apparatus that employs single point scanning using a two-axis scanner could be used as an alternative to the single-axis line scanning apparatus shown in FIG. 5. Direct modulation of the laser beam by a variable control signal or use of an acousto-optic modulator or of some other gating device as a light beam modulator would be required when employing a laser display apparatus having a dual-axis scanner for single point scanning.

Alternatively, a Digital Micromirror Device (DMD) such as those used in Digital Light Processing projection apparatus from Texas Instruments, Dallas, Tex., could also be used for laser light modulation. The two-dimensional DMD device would not require a scanner 40 apparatus (as shown in FIG. 5) for projection of the modulated light. As yet another alternative to the embodiment of FIG. 5, a separate projection lens 46, and depending on the type of modulation components employed, a separate scanner 40 apparatus could be used for each color channel.

Processing by Imaging Control Logic Processor 52

The present invention employs novel image data processing that is performed by imaging control logic processor 52. The processing employed for gamut expansion is shown using the sequence of CIE color gamut representations in FIGS. 4A through 4F.

For the purposes of description, primary color component values are represented as ranging from 0 to 100. For this discussion, a 0 value indicates absence of a primary color component; a 100 value indicates full intensity of a primary color. Using this convention, any color within its corresponding color gamut would be encoded in the following form:

(r_value, g_value, b_value)

wherein
- r_value is in the range from 0 to 100;
- g_value is in the range from 0 to 100;
- b_value is in the range from 0 to 100.

Thus, for example, in FIG. 4A, the data value (10, 100, 50) for a color coordinate point 104 represents a particular color having very little red component, a maximum value of green component, and a middling value of blue component.

FIG. 4A shows a conventional original color gamut 100 of broadcast-encoded data, having a chromaticity range defined by phosphor-based primaries 102r, 102g, and 102b that are vertices defining original color gamut 100, where original color gamut 100 is a standard broadcast color gamut, such as defined using ITU Rec. 709 or PAL standards. The outer curve of spectrum locus 10 represents the range of pure colors, as was described earlier with reference to FIG. 1A. Points 16r, 16g, and 16b represent the chromaticity values of laser primaries from lasers 54r, 54g, and 54b, respectively, in display apparatus 50 of FIG. 5. For the specific example of FIG. 4A, the wavelengths of the laser primaries corresponding to points 16r, 16g, and 16b are 629 nm, 532 nm, and 465 nm, respectively.

For the initial state of broadcast-encoded data shown in FIG. 4A, vertices for primaries 102r, 102g, and 102b have data values indicated in Table 1. For example, red primary 102r has a data value of (100, 0, 0) in this initial broadcast-encoded data.

FIG. 4B represents the intermediate gamut definition step performed by imaging control logic processor 52 in executing the method of the present invention. Recall that the present invention expands the color gamut to use more of the color gamut afforded by the pure wavelengths provided by lasers 54r, 54g, and 54b. Stated differently, the present invention provides an image having an expanded chromaticity range. A display color gamut 110, shown by dotted lines connecting points 16r, 16g, and 16b, represents the full possible gamut or chromaticity range afforded by display apparatus 50. In display color gamut 110, a data value of (0, 100, 0) would correspond to full intensity of laser 54g and no light emission from lasers 54r and 54b (FIG. 5). Thus, the broadcast image data originally encoded within original color gamut 100 could simply be used as input data to display color gamut 110. However, this would not provide a pleasing result. As the background section herein is indicated, simply displaying the broadcast encoded data according to display color gamut 110 yields visually unacceptable color reproduction and can compromise near-neutral colors. Instead, as shown in FIG. 4B, the present invention defines an intermediate color gamut 120 by selecting intermediate primary colors at points 122r, 122b, and 122g that form the vertices of intermediate color gamut 120. As its name implies, intermediate color gamut 120 is bounded by display color gamut 110. Moreover, intermediate color gamut 120 substantially overlaps the area of original color gamut 100. Proper selection of the primary chromaticity coordinates comprising intermediate color gamut 120 defines intermediate color gamut 120 as having the same overall shape, as a substantially similar triangle, to display color gamut 110.

Recall from the background section herein and FIG. 1B that lines of constant hue radiate outward from the central neutral color of white point 20. To maintain hue fidelity with display color gamut 110 requires that primary colors for points 122r, 122b, and 122g be selected to be substantially of the same hue as their counterpart laser-based primaries corresponding to points 16r, 16g, and 16b. This criterion, then, forms the basis for the selection of appropriate intermediate primary colors at points 122r, 122b, and 122g that define intermediate color gamut 120. The distance between intermediate primaries at points 122r, 122b, and 122g and their respective display device primaries at points 16r, 16g, and 16b is generally proportional to the increase that can be obtained in the displayed gamut of the reproduced image. Distances between the primaries must be carefully selected so as either not to over- or under-emphasize particular color regions. In practice, these intermediate primary colors can be obtained by empirical methods; however, computational techniques could also be employed to specify the set of colors best used with a particular display apparatus 50.

The next step in processing is data transformation, as illustrated in FIG. 4C. This processing step maps color coordinates from original color gamut 100 that were originally encoded in terms of broadcast RGB primaries into the coordinate system of intermediate color gamut 120 in terms of intermediate RGB primaries. This processing step, then, is a relatively straightforward re-mapping of color coordinates, so that values originally in standard broadcast original color gamut 100 are now expressed as values within the larger intermediate color gamut 120. Original primaries 102r, 102g, and 102b now have re-mapped values as shown in Table 2 in FIG. 4C. Recall, for example, that primary 102r was originally a vertex in original color gamut 100 of FIG. 4A with values (100, 0, 0). Now, in the re-mapping to intermediate color gamut 120, point 102r now has values (73.7, 2.3, 0.1). Correspondingly, all points within original color gamut 100 have re-mapped values expressed in terms of the intermediate color primaries. For example, color coordinate point 104, given value (10, 100, 50) in the original data, now has re-mapped value (33.9, 98.6, 51.3). In this way, each color coordinate within original color gamut 100 is now expressed as a color coordinate in intermediate color gamut 120.

A straightforward transformation technique can be used to convert image data values from standard broadcast-encoded image data defining original color gamut 100 to intermediate color image data values using intermediate color primaries defining color gamut 120. In one embodiment, a simple [3×3] matrix is used as transform 84 (FIG. 3) to effect this transformation, using techniques well known in the imaging arts. Alternatively, look-up tables (LUTs) or other computational methods could be employed, if desired. For example, all of the steps performed by processor 78 could be replaced by a single three-dimensional (3-D) look-up table transformation, providing conversion between input data in HDTV primaries and display device input code values. Such a 3-D LUT can be calculated from the sequence shown in FIG. 3 or can be obtained by other methods.

As shown in one example, where the laser projector has a 465 nm blue primary, a 532 nm green primary and a 629 nm red primary, a suitable transform 84 that provides calorimetric primary conversion from Rec. 709 RGB (of original color gamut 100) directly to laser projector RGB colors without increasing the saturation of the reproduced colors is represented by the following 3×3 matrix transformation:

$$\begin{bmatrix} R_\lambda \\ G_\lambda \\ B_\lambda \end{bmatrix} = \begin{bmatrix} 0.635 & 0.332 & 0.033 \\ 0.067 & 0.908 & 0.026 \\ 0.016 & 0.088 & 0.896 \end{bmatrix} * \begin{bmatrix} R_{709} \\ G_{709} \\ B_{709} \end{bmatrix}$$

This matrix transformation can be computed using methods known to those skilled in the art.

In one embodiment of the present invention, a novel conversion from Rec. 709 RGB to laser projection RGB is given by transform 84 having the following form:

$$\begin{bmatrix} R_\lambda \\ G_\lambda \\ B_\lambda \end{bmatrix} = \begin{bmatrix} 0.737 & 0.269 & -0.006 \\ 0.023 & 0.990 & -0.013 \\ 0.001 & 0.026 & 0.973 \end{bmatrix} * \begin{bmatrix} R_{709} \\ G_{709} \\ B_{709} \end{bmatrix}$$

When applied to the laser projector having a blue primary at 465 nm, a green primary at 532 nm and a red primary at 629 nm, this transform increases the saturation of reproduced colors while maintaining constant perceived hue.

FIGS. 4D and 4E show what happens when this re-mapped color data is, in turn, provided to the display hardware. As FIG. 4D shows, color image data expressed in terms of intermediate vertex color coordinates 122r, 122g, and 122b are now input directly to the corresponding primary colors provided by lasers 54r, 54g, and 54b at points 16r, 16g, and 16b, respectively. FIG. 4E shows the result yielded by this transformation. In effect, original color gamut 100 is expanded in area. Calculation of area of a color gamut can be performed in a number of ways, as described subsequently. However, unlike conventional approaches, the expanded color gamut provided by an expanded image chromaticity range 100' is somewhat smaller than laser display color gamut 110 with primary colors at points 16r, 16g, and 16b. Instead, a set of effective calculated color coordinate points 102r', 102g' and 102b' provide vertices that define the gamut boundaries of expanded image chromaticity range 100'. Expanded image chromaticity range 100' has the approximate shape of original broadcast color gamut 100, and is effectively "stretched" and adapted for the set of laser 54r, 54g, and 54b primaries. FIG. 4F shows the effect of this color gamut expansion on individual colors within the broadcast primary gamut of original color gamut 100 wherein the origins of vectors 101 represent colors encoded according to original color gamut 100 and the arrow heads of vectors 101 represent the reproductions of those colors according to the teachings of the present invention. The relative amount of saturation increase is based on the chromatic distance of a color from white point 20, as indicated by the proportionately varied lengths of arrows 101 in FIG. 4F.

In the description of the present invention, the terminology "expanded image chromaticity range 100' is used to describe what could alternately be termed the "expanded gamut" that is actually provided by display apparatus 50. Making this distinction is useful since vertices provided by color coordinate points 102r', 102g' and 102b' that define expanded image chromaticity range 100' are not actual primary colors provided by emissive light sources (as are points 16r, 16g, and 16b for display apparatus 50 as well as primaries 102r, 102g, and 102b for the broadcast-encoded original color gamut) but are calculated or "virtual" points in color space. Expanded image chromaticity range 100' provides a continuous set of colors that can be provided from display apparatus 50, wherein this set of colors subtends or encloses an area of color space that exceeds the area of original color gamut 100 and is somewhat less than the area of display color gamut 110.

The method of the present invention achieves a compromise between using the full device gamut of display color gamut 110 and maintaining hue fidelity. Instead of attempting to display colors ranging over the full display color gamut 110, the method described with reference to FIGS. 4A through 4F uses only a portion of display color gamut 110. Thus, counter-intuitively, the full expanded chromaticity that is possible with display color gamut 110 is sacrificed somewhat, with the benefits of hue fidelity and an overall increase in gamut. The saturation of highly chromatic colors is increased significantly, providing a pleasing visual effect, taking advantage of the larger gamut area for these colors. At the same time, however, near-neutrals and flesh tones are realistically reproduced, unlike what happens with conventional color gamut expansion to primary colors.

In terms of display apparatus 50 hardware, a result of this novel process is that neither light from red laser 54r nor light from green laser 54g is used singularly to form any color. For example, whenever green laser 54g light is modulated to form a color, at least one of either red or blue lasers 54r or 54b intentionally also provides modulated light above its dark threshold. Thus, with the possible exception of some colors in the blue region, displaying any pixel from display apparatus 50 requires light from at least two of lasers 54r, 54g, or 54b. Of course, at very low light levels, it may be difficult to detect light from these other sources. In practice, whenever light from green laser 54g is modulated at more than about 20% of its maximum output value, light from at least one of red and/or blue lasers 54r, 54b is also modulated above a dark threshold level.

Figure 6A:
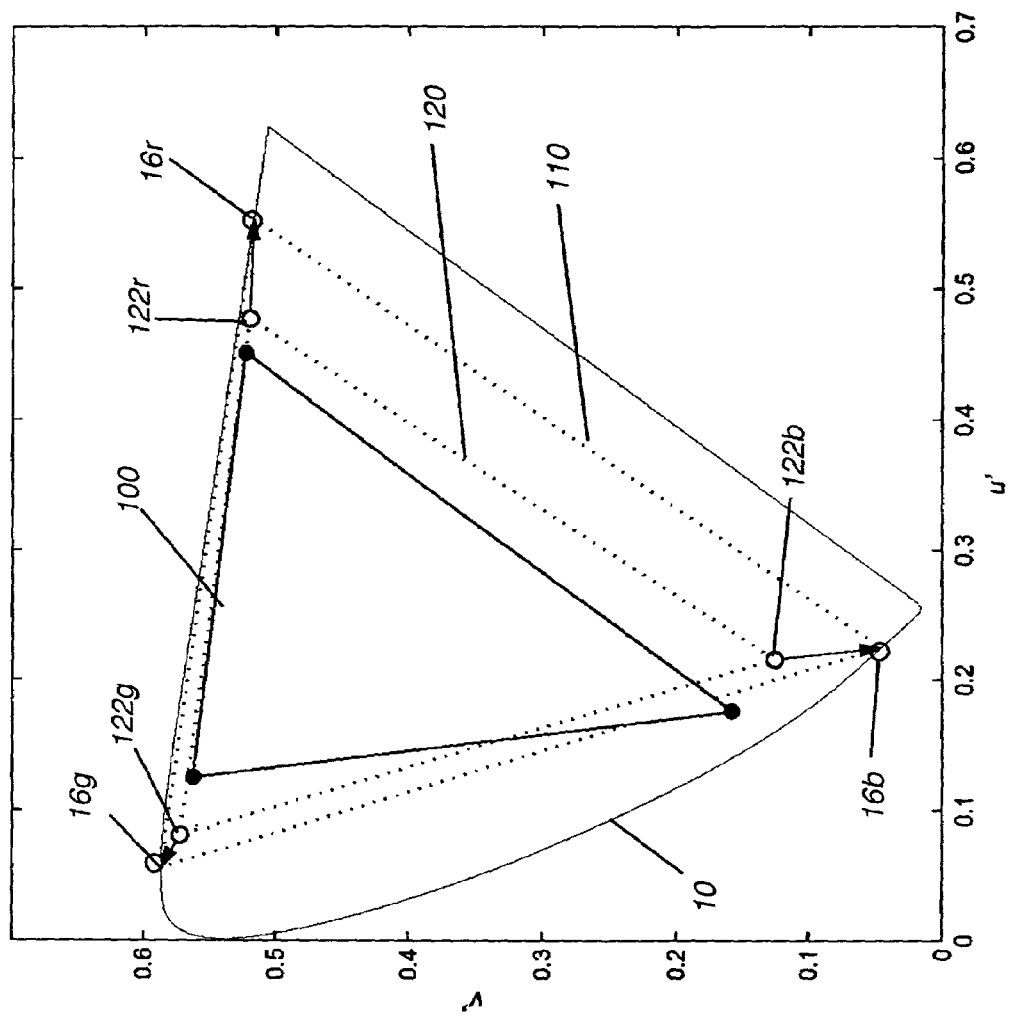
Figure 6B:
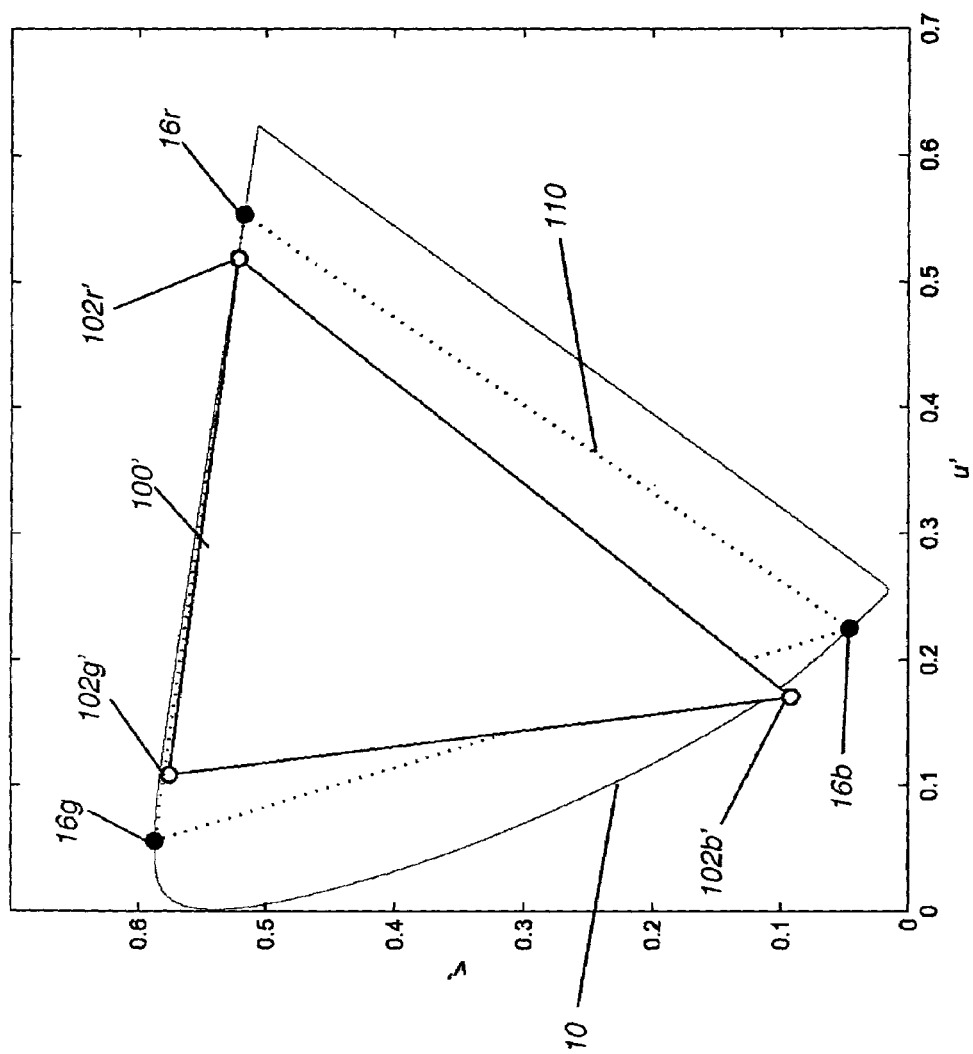

The sequence of FIGS. 4A through 4F showed how the color gamut is obtained for display apparatus 50 having example laser wavelengths at 629 nm, 532 nm, and 465 nm, respectively. In this embodiment, display color gamut 110 bounds intermediate color gamut 120 and intermediate color gamut 120 substantially bounds original color gamut 100. However, in some cases, it may happen that display color gamut 110 does not fully bound original color gamut 100, depending on the selection of wavelengths for lasers 54r, 54g, or 54b. FIGS. 6A and 6B show an example in which a blue laser having wavelength 446 nm is used as 54b. Here, display color gamut 110 does not fully bound original color gamut 100. In such a case, a remapping of specific colors may be needed, using techniques well known in the imaging arts. This behavior can be particularly true in the blue region, as shown. For "out-of-bound" colors, interpolation techniques for color re-mapping, known to those skilled in the display imaging arts, would be required.

It can be observed that the expanded image color that is provided using this method requires only one straightforward transformation of the image data, as was described with reference to FIG. 4C. No alteration of device drivers for the lasers is required. The method of the present invention would not require hardware changes to display logic devices, provided that the laser display data path already includes the processing steps described with reference to FIG. 3.

The method of the present invention achieves a number of results, including the following:

(i) As is shown in the sequence of FIGS. 4A through 4F, the area of the expanded image chromaticity range 100' that is produced using this method exceeds the area of original (ITU Rec. 709) color gamut 100. At the same time, however, the area of image chromaticity range 100' that is produced using this method is less than the area of display color gamut 110 that can be obtained by display apparatus 50. This result is unlike the results obtained by conventional color mapping methods, as described in the background section above. Using the conventional CIE u',v' representation used in FIGS. 4A through 4F, the percentage area of a color gamut can be computed using metrics described by M. H. Brill in "Colors and Display Measurements", disclosed in a presentation given to the Society for Information Display (SID) Mid-Atlantic Chapter on Oct. 13, 1999 and documented in file brill1013b.pdf, currently available from the SID website (www.sid.org). This calculation is as follows:

$$\text{Area} = \frac{100}{0.1952} * \frac{|(u'_r - u'_b)(v'_g - v'_b) - (u'_g - u'_b)(v'_r - v'_b)|}{2}$$

where the area bounded by spectrum locus 10 and purple boundary 11 (FIG. 1A) is 0.1952. Multiplication by 100 yields a relative percentage, and u'$_r$, u'$_g$, u'$_b$, v'$_r$, v'$_g$, and v'$_b$ are CIE u',v' coordinates for the respective vertices that define the color gamut.

For example, the relative area of original color gamut 100 using the standard ITU Rec. 709 primaries is computed as follows:

$$\text{Area} = \frac{100}{0.1952} * \frac{\begin{vmatrix}(.4507-.1754)(.5625-.1579)-\\(.1250-.1754)(.5229-.1579)\end{vmatrix}}{2} = 33.2$$

The relative area of display color gamut 110 of an apparatus according to the present invention using one set of laser primaries is computed as follows:

$$\text{Area} = \frac{100}{0.1952} * \frac{\begin{vmatrix}(.5533-.1690)(.5868-.1119)-\\(.0557-.1690)(.5170-.1119)\end{vmatrix}}{2} = 58.5$$

The relative area of expanded image chromaticity range 100' using the method of the present invention with one set of laser primaries can be computed as follows:

$$\text{Area} = \frac{100}{0.1952} * \frac{\begin{vmatrix}(.5188-.1704)(.5752-.0920)-\\(.1084-.1704)(.5213-.0920)\end{vmatrix}}{2} = 49.9$$

More generally, the relative area of expanded image chromaticity range 100' can be considered to be the area of color space that is subtended by the full set of colors that are available within expanded image chromaticity range 100' using the method of the present invention. Thus, in this example, the increase in gamut of displayed colors in comparing expanded image chromaticity range 100' to original color gamut 100 is equivalent to:

$$\frac{49.9}{33.2} \approx 1.50$$

In this example, then, there is a gamut increase of about 50 percent. Satisfactory increase in color gamut is achieved when the area of expanded image chromaticity range 100' exceeds the area of original color gamut 100 by at least 10%, using this method of calculation.

(ii) Except for white point 20, for a color coordinate in original color gamut 100, when transformed to a color coordinate in image chromaticity range 100', there is an increase in CIE metric chroma C*. Ideally, white point 20 is unaltered. Moreover, the CIE metric chroma difference ΔC* increases monotonically with increased distance from white point 20. At the same time, meanwhile, any CIE psychometric hue difference ΔH* for a transformed color is minimal, to within a value of 5, preferably within a value of 3 or less.

(iii) Expanded image chromaticity range 100' is substantially bounded between display color gamut 110 and original (ITU Rec. 709) color gamut 100. As was shown in FIGS. 6A and 6B, there may be a small portion of expanded image chromaticity range 100' that overlaps or lies outside display color gamut 110, particularly in the blue region, depending on the primary colors used in display apparatus 50.

While the description given with reference to FIG. 5 focuses on a three-color apparatus using a separate spatial light modulator 56r, 56g, 56b for each primary color, the method of the present invention could also be used with alternative design approaches, including the use of a color sequential apparatus, in which primary colors are repeatedly sequenced, at a high rate, for successive modulation by one or two spatial light modulators. For color sequential display, time integration is used to synthesize any color from its composite primaries, using methods well known in the electronic imaging arts.

The method of the present invention is particularly well suited for narrow-band emissive color light sources such as lasers that emit light over a very narrow band of wavelengths. Typically, a narrow-band emissive light source emits more than half its output light at a nominal wavelength, within about +/−10 nm. In terms of ITU Rec. 709, the vertex associated with a narrow-band emissive light source would lie substantially outside original (ITU Rec. 709) color gamut 100. This method can be used with lasers of a number of different types, including double-pumped solid-state lasers, semiconductor lasers, organic lasers, and laser arrays. Continuing improvements to Light-Emitting Diode (LED) performance suggest that there is also the potential for using LED light sources or other types of narrow-band light sources in display apparatus 50 as an alternative light source to lasers 54r, 54g, and 54b. The hue of one or more of the narrow-band emissive light sources may be perceptibly different from the hue of the corresponding primary of the original color gamut.

The apparatus and method of the present invention allow the bit depth of color image data to be at any appropriate level for the display. Using a higher bit depth, such as 10 or 12 bits per color, would help to allow smooth transitions and minimize quantization artifacts in shadow details, for example. While the method of the present invention is particularly well suited for display of broadcast-encoded image data, it can be more generally used with any type of encoded input image data. Thus, what is provided is a method and apparatus for a color display using narrow-band emissive light sources to provide an expanded color gamut.

A display apparatus may use three lasers or other narrow-band emissive light sources, following the conventional tristimulus RGB color model as described for the embodiment of FIG. 5. However, additional colors could be added to expand display color gamut 110 and, consequently, expanded image chromaticity range 100' even further.

The invention has been described with reference to a preferred embodiment. However, it will be appreciated that variations and modifications can be effected by a person of ordinary skill in the art without departing from the scope of the invention. The method of the present invention can be used with any of a number of spatial light modulators, including scanned linear GEMS devices and GLV (Grating Light Valve) devices, and two-dimensional LCD array modulators, and other types of devices.

PARTS LIST 10 spectrum locus
11 purple boundary
12 triangle
14r, 14g, 14b vertices
16r, 16g, 16b points
20 white point
22 hue line
24, 26 coordinates
30 color combining optics
40 scanner
42 color signal
44 lens
46 projection lens
50 display apparatus
52 imaging control logic processor
54r, 54g, 54b laser
56r, 56g, 56b spatial light modulator
58 X-cube
60 scene
61 image capture section
62 camera
63 data storage device
64 medium
66 telecine apparatus
68 processing section
70 broadcast encoded data
72 HDTV primaries
74 processor
76 transform
78 processor
80 linear RGB data
82 transform
84 transform
88 transform
90 display surface
92 pixel
100 original color gamut
100' expanded image chromaticity range
101 arrow
102r, 102g, 102b primaries
102r', 102g', 102b' effective color coordinate points
104 color coordinate point
106 linear HDTV data
110 display color gamut
120 intermediate color gamut
122r, 122g, 122b points

What is claimed is:

1. A method for displaying a color image comprising:
a) providing a color image display apparatus having at least three narrow-band emissive light sources that define a display color gamut;
b) accepting input color image data values that are defined within an original color gamut that is smaller in area than the display color gamut;
c) transforming the input color image data values into display color gamut data values having an expanded chromaticity range,
wherein at least a portion of the expanded chromaticity range lies outside the original color gamut,
and wherein at least a portion of the display color gamut lies outside the expanded chromaticity range;
d) providing the display color gamut data values to the color image display apparatus for forming the color image;
e) wherein, for an image pixel on the display apparatus, a hue associated with the input image data value is substantially the same as a hue of the displayed color generated by the color image display apparatus with the corresponding display color gamut data value;
f) wherein, for a given input image data value, the hue of the displayed color generated by the color image display apparatus with the corresponding display color gamut data value is within at least a standard psychometric hue difference of +/−5 of the hue given by the input color image data value.

2. The method according to claim 1 wherein the step of transforming the input color image data values into display color gamut data values yields a monotonic increase in displayed color saturation such that:
for a first input color image data value at a first chromatic distance from a white point and convened to a first display color gamut data value, and,
for a second input color image data value at a second chromatic distance from the white point and convened to a second display color gamut data value,
wherein the second chromatic distance exceeds the first chromatic distance,
the increase in displayed color saturation of the second display color gamut data value relative to its second input color image data value
exceeds the increase in displayed color saturation of the first display color gamut data value relative to its first input color image data value.

3. The method according to claim 1 wherein the at least three narrow-band emissive light sources are lasers.

4. The method according to claim 1 wherein the input color image data values are broadcast-encoded.

5. The method according to claim 1 wherein the area of the expanded image chromaticity range exceeds the area of the original color gamut by at least 10%.

6. The method according to claim 1 wherein the area of the display color gamut exceeds the area of the original color gamut by at least 50% and
wherein the area of the display color gamut exceeds the area of the expanded image chromaticity range by at least 10%.

7. The method according to claim 1 wherein the step of transforming the input color image data values into display color gamut data values having an expanded image chromaticity range comprises forming re-mapped image data values by mapping each input color image data value for each image pixel to an intermediate color gamut image data value within an intermediate color gamut, wherein:
(a) the intermediate color gamut is substantially bounded within the display color gamut that is defined by the narrow-band emissive primaries;
(b) the intermediate color gamut comprises colors outside the chromaticity range of the input color image data; and,
(c) the display color gamut comprises colors outside the range of the intermediate color gamut.

8. The method according to claim 1 wherein the at least three narrow-band emissive light sources each emit more than ½ of their output light within a ±10 nm band of wavelengths.

9. The method according to claim 1 wherein a hue of at least one of the narrow-band emissive light sources is perceptibly different from a hue of the corresponding primary of the original color gamut.

10. A method for display of an image comprising:
 a) providing a display apparatus having at least three lasers, wherein the at least three lasers define a display color gamut;
 b) accepting input image data values defined within an original color gamut,
  wherein the original color gamut is smaller in area than the display color gamut defined by the at least three lasers;
 c) transforming each input image data value to a display device data value in the display color gamut,
  wherein the area subtended by the full set of transformed image data values defines an expanded image chromaticity range having an area which exceeds the area of the original color gamut and
  which is less than the area of the display color gamut;
 d) providing the display device data values to the display apparatus to form the image; and
 e) wherein, for each input image data value, the corresponding transformed display device data value is within a standard psychometric hue difference +/−of 5.

11. The method according to claim 10 wherein the area of the display color gamut exceeds the area of the original color gamut by at least 50%.

12. The method according to claim 10 wherein the area of the display color gamut exceeds the area of the expanded image chromaticity range by at least 10%.

13. The method according to claim 10 wherein the step of transforming the input image data values into display device data values yields a monotonic increase in displayed color saturation such that:
 for a first input image data value at a first chromatic distance from a white point and converted to a first display device data value, and,
 for a second input image data value at a second chromatic distance from the white point and convened to a second display device data value,
 wherein the second chromatic distance exceeds the first chromatic distance,
 the increase in displayed color saturation of the second display device data value relative to its second input image data value
 exceeds the increase in displayed color saturation of the first display device data value relative to its first input image data value.

14. The method according to claim 10 wherein a hue of at least one of the lasers is perceptibly different from a hue of the corresponding primary of the original color gamut.

15. A display apparatus for forming an image as an array of pixels, comprising:
 a) a laser emitting green light at a wavelength in a range between 500 and 550 nm and modulated over a range from a dark threshold to a maximum output;
 b) at least two other lasers;
  wherein each laser serves as a primary color for forming a pixel and is modulated according to a control signal, the display apparatus displaying an image such that for any pixel wherein the green laser light is modulated at a level above 20% of its maximum output, light from at least one of the two other lasers is also modulated at a level above its dark threshold; and,
 c) an imaging control logic processor that i) accepts an input image data value defined within an original color gamut,
  wherein the original color gamut is smaller in area than a display color gamut defined by the at least three lasers;
 ii) transforms the input image data value into a display color gamut data value having an expanded image chromaticity range,
  wherein the expanded image chromaticity range of the display color gamut data values is bounded within the display color gamut,
  such that a portion of the display color gamut lies outside the expanded image chromaticity range of the display color gamut data values,
  and wherein a portion of the expanded image chromaticity range of the display color gamut data values lies outside the original color gamut; and,
 iii) modulates the light from one or more of the lasers according to the display color gamut data values.

16. The display apparatus of claim 15 wherein each laser provides light to the displayed pixel in a color-sequential manner.

17. The display apparatus of claim 15 wherein one of the at least two other lasers emits visible light in the red region and any pixel containing green laser light at a level above 20% of the maximum output also contains red laser light.

18. A display apparatus comprising:
 a) a set of at least three narrow-band emissive light sources, each light source emitting light at a visible wavelength, the emitted light serving as a primary color,
  wherein the at least three narrow-band emissive light sources define a display color gamut;
 b) an imaging control logic processor configured:
  (i) to accept input image data for display pixels, the input image data encoded as color coordinates in a broadcast format, wherein the broadcast format is defined within an original color gamut;
  (ii) to transform the color coordinates for each pixel from the coordinates defined by the broadcast format into transformed color coordinates in the display color gamut,
   wherein a total area subtended by a full set of transformed color coordinates for an image is less than 90 percent of the area of the display color gamut, and
   wherein the total area subtended by the full set of transformed color coordinates for an image exceeds the area of the original color gamut by at least 10 percent;
  (iii) to provide the transformed color coordinates for each pixel as display device input code values to the display apparatus;
 c) at least one modulator for modulating the emissive narrow-band light sources according to the transformed color coordinates to form an image thereby; and
 d) wherein the standard metric chroma difference between any broadcast-encoded coordinate for a pixel and its corresponding transformed color coordinate increases monotonically with increasing distance of the broadcast-encoded coordinate from a white point of the display apparatus.

19. A display apparatus according to claim 18 wherein at least one of the narrow-band emissive light sources is either a laser or an LED.

20. The display apparatus of claim 18 wherein the at least one modulator is selected from the group consisting of a conformal grating device, a grating light valve device, a digital micromirror device, an acousto-optical light gating device.

21. The display apparatus of claim 18 wherein the at least one modulator is provided with a variable drive signal.

22. The display apparatus of claim 18 wherein any transformed color coordinate is within a standard psychometric hue difference +/− of 5 relative to its hue value within the broadcast format.

23. The display apparatus of claim 18 wherein the area of the display color gamut exceeds the area of the original color gamut by at least 50%.

* * * * *